Figure 3:
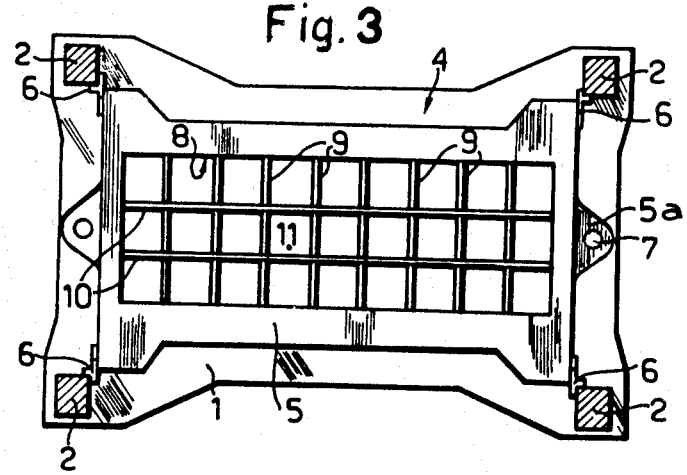

Dec. 7, 1965
G. DELZANNO
3,222,495
MULTIPLE WELDING MACHINE
Filed Jan. 23, 1964
3 Sheets-Sheet 1
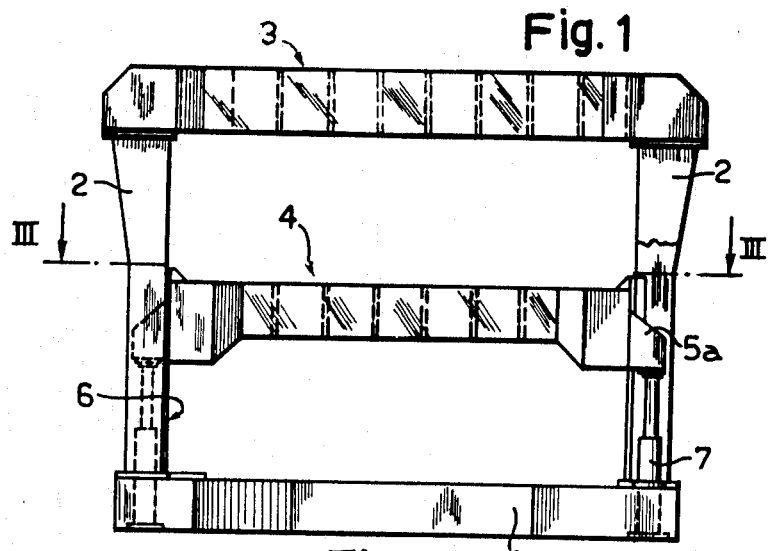
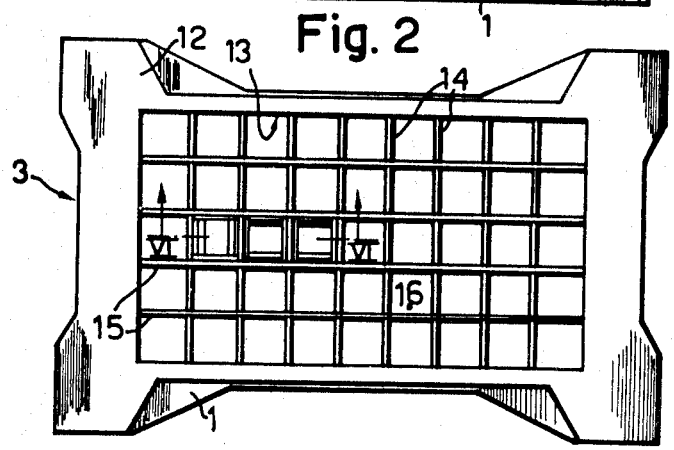
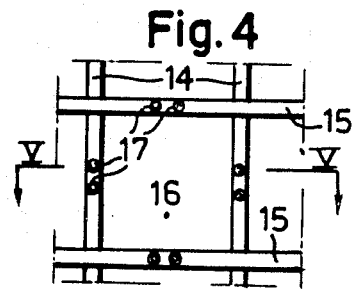
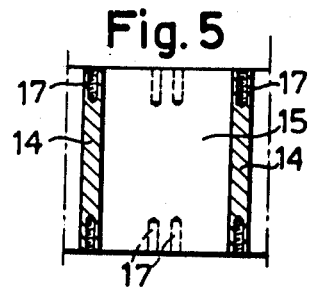

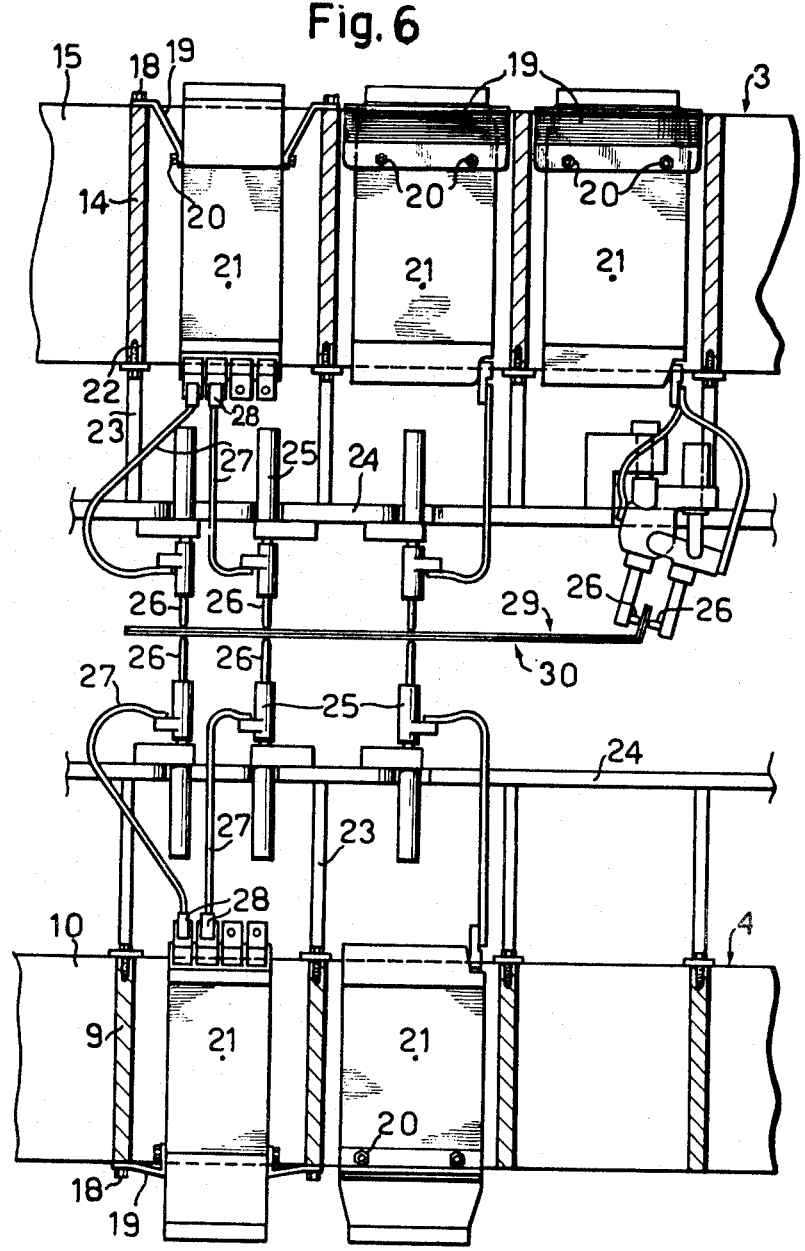

though rectangular in contour and two sets of vertical diaphragms extending between pairs of opposite frame sides in a perpendicular direction to said sides, the diaphragms in each set being equally spaced, the spacing of two consecutive diaphragms in one set equalling the spacing of two consecutive diaphragms in the other set, said diaphragms defining mutually and with respect to the inner contour of the frame a plurality of prismatic cells of substantially square cross-sectional form, open at their top and bottom ends and of a size such as to accommodate the transformers feeding the electrodes.

3,222,495
MULTIPLE WELDING MACHINE
Giuseppe Delzanno, Turin, Italy, assignor to Fiat Società per Azione, Turin, Italy
Filed Jan. 23, 1964, Ser. No. 339,669
Claims priority, application Italy, Jan. 24, 1963, 2,035/63
1 Claim. (Cl. 219—87)

This invention relates to multiple electric welding machines of the type more particularly employed by automobile industries.

The known welding machines of this type have a framework comprising a bedplate carrying vertical posts supporting a stationary horizontal plate and acting as guides for the vertical displacement of a movable horizontal plate. These stationary and movable plates have detachably secured thereto transformers and welding electrodes which are electrically connected with the secondary windings of the transformers.

The electrodes carried by these two plates should be adjusted in position on starting of any new welding operation, which implies re-positioning of the transformers to suit the job and so as to use connecting cables of minimum length to connect the terminals of the secondary windings of the transformers with their respective electrodes in order to avoid power losses.

The object of this invention is to provide a framework for multiple electric welding machines of the above-mentioned type, which facilitates attachment of the transformers to the plates in desired positions.

The improved welding machine has a stationary and a movable plate each comprising a peripheral frame defining a central opening substantially rectangular in contour, and two sets of vertical diaphragms arranged in the middle opening of the frame, extending between pairs of opposite frame sides in a perpendicular direction to said sides, the diaphragms in each set being equally spaced, the spacing of two consecutive diaphragms in one set equalling the spacing of two consecutive diaphragms in the other set, said diaphragms defining mutually and with respect to the inner contour of the frame a plurality of prismatic cells of substantially square cross-sectional form, open at their top and bottom ends and of a size such as to accommodate the transformers feeding the electrodes.

The invention will be described with reference to the accompanying drawings showing, by way of example, an embodiment thereof.

Figure 7:
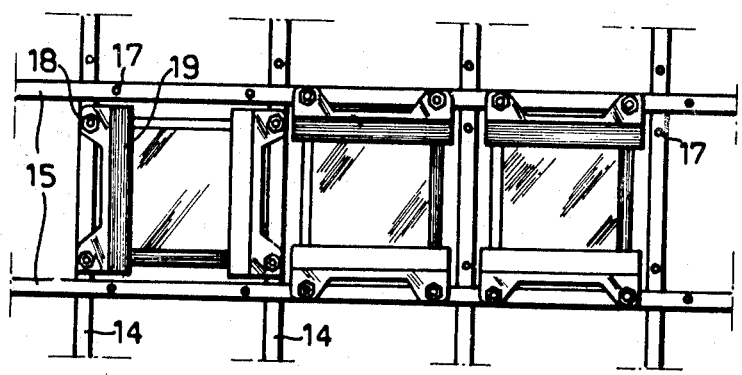

FIGURE 1 is an elevational view of the framework of an electric welding machine, FIGURE 2 is a plan view of FIGURE 1, FIGURE 3 is a sectional view on line III—III of FIGURE 1, FIGURE 4 is a plan view of a cell, FIGURE 5 is a sectional view on line V—V of FIG. 4, FIGURE 6 is a part sectional view of the framework on line VI—VI of FIGURE 2 on an enlarged scale showing, in addition, the transformers and electrodes, and FIGURE 7 is a part plan view of FIGURE 6.

The framework of the multiple electric welding machine comprises in a known manner a bedplate 1 and vertical posts 2 extending from the bedplate to a stationary top plate 3.

A movable plate 4 is mounted between the bedplate 1 and the top plate 3 and comprises a frame 5 formed with guides 6 for vertical sliding along the posts 2. Vertical movement of the movable plate 4 is controlled in a known manner by means denoted on the drawing by pressure fluid operated jacks 7 interposed between the bedplate and lateral extensions 5a on the frame 5.

The frame 5 defines a central opening 8, FIGURE 3, of rectangular contour, two sets of vertical diaphragms 9, 10 extending between the pairs of opposite sides of said contour perpendicular to said sides.

The diaphragms in each set 9, 10 are equally spaced, the spacing of each two adjacent diaphragms 9 equalling the spacing of two adjacent diaphragms 10, so that said diaphragms define together and with the inner surface of the frame 5 a plurality of prismatic cells 11 square in cross section, said cells being open at their top and bottom ends.

The stationary top plate 3 of the framework is similar in structure to the above described movable plate, in that the former comprises a peripheral frame 12, FIGURE 2, defining a central opening 13 of rectangular contour, and two sets of diaphragms 14, 15, respectively, defining together and with the inner surface of the frame 12 a plurality of cells 16 similar in size and orientation as the cells 11. The horizontal opposite faces of the diaphragms 9, 10 and 14, 15, respectively, which confine the cells 11, 16, respectively, have tapped blind holes 17 formed therein.

The cells 11, 16 are of such size as to accommodate the transformers adapted to feed the welding electrodes.

Attachment of the transformers and electrodes to the plates 3, 4 is clearly shown in FIGURES 6, 7.

The holes 17 bored in one of the faces of the diaphragms 14, 15 and 9, 10 associated with each plate are utilized for attachment by means of screws 18 of straps 19 which are fixed at their other end by means of screws 20 to the transformers 21 accommodated by the cells.

Whereas the holes 17 bored at the opposite face of said diaphragms are utilized for securing by means of screws 22 vertical supports 23 for horizontal bars 24 having attached thereto fluid pressure operated jacks 25 supporting the electrodes 26. Leads 27 connect the electrodes 26 with terminals 28 of the secondary windings of the transformers 21.

FIGURE 6 shows two metal sheets 29, 30 which are spot welded by means of four pairs of electrodes 26.

The above described cellular construction of the middle portion of the stationary and movable plates of the framework enables positioning of the transformers 21 in a simple and quick manner as required for performing a given welding operation, and to minimize the length of the leads 27, hence power losses.

Moreover, the above described construction of the plates 3, 4 results in a structure of reduced weight and improved stiffness.

What I claim is:

Multiple electric welding machine of the type comprising a bedplate carrying posts supporting a stationary horizontal plate and acting as guides for vertical displacement of a movable horizontal plate, said stationary and movable plates having detachably secured thereto welding electrodes and feed transformers therefor, wherein each stationary and movable plate, respectively, comprises a peripheral frame confining a central opening of prismatic cells having formed therein tapped holes for substantially rectangular contour and two sets of vertical diaphragms arranged in the central opening in the frame, extending between pairs of opposite frame sides perpendicular thereto, the diaphragms in each set being equally spaced, the spacing of adjacent diaphragms in one set equalling the spacing of adjacent diaphragms in the other set, said diaphragms defining together and with the inner contour of the frame a plurality of prismatic cells of square cross-sectional shape, opened at their top and bottom ends and of a size such as to accommodate the feed transformers for the electrodes, horizontal faces of said vertical diaphragms forming walls for the individual screw attachment of supporting straps carried by the transformers, and supports for the electrodes.

References Cited by the Examiner

UNITED STATES PATENTS

| | | | |
|---|---|---|---|
| 1,069,197 | 8/1913 | Smith | 219—56 |
| 1,915,639 | 6/1933 | Woofter | 219—116 |

FOREIGN PATENTS 191,224    8/1957    Austria.

RICHARD M. WOOD, *Primary Examiner.*